Patented Feb. 13, 1951

2,541,676

UNITED STATES PATENT OFFICE 2,541,676

THROMBOPLASTIC PREPARATION

André Studer, Basel, Switzerland, assignor to Hoffmann-La Roche Inc., Nutley, N. J., a corporation of New Jersey No Drawing. Application May 17, 1947, Serial No. 748,851. In Switzerland June 21, 1946

7 Claims. (Cl. 195—63)

This invention relates to a thromboplastic preparation.

Thromboplastin is the name given to the ferment which is responsible for the transformation of prothrombin into thrombin. Neither the structure of thromboplastin itself nor the mechanism of its action have yet been fully clarified. According to Howell (Amer. J. Physiol., vol. 31, year 1912, page 1) thromboplastin is a substance having a protein part and a lipoid part. Cohen and Chargaff (J. biol. Chem., vol. 136, year 1940, page 243) have shown that a lipoid fraction possessing the capacity of stimulating blood coagulation may be obtained by extracting a thromboplastic preparation from cow lungs with alcohol and ether. The activity of the lipoid fraction obtained in this way is, however, markedly lower than that of the original preparation while, moreover, the protein fraction, i. e., the residue of the extraction, is completely inactive.

The practical possibilities of preparations of thromboplastin obtained from animal organs, such as, for example, brains or lungs, are markedly limited by the fact of their incomplete solubility in water and by the fact that there is a diminution in activity when the usual sterilisation methods, such as heating or filtration through a Seitz or similar filter, are applied to them.

It has now been found, according to the present invention, that preparations having a thromboplastic activity and which are soluble in water and obtainable in a sterile condition may be obtained by combining a digestive ferment with plant or animal lipoids.

According to the process of the present invention, water soluble preparations having thromboplastic activity may be obtained by combining a digestive ferment, such as pancreatin or trypsin, with plant or animal lipoids.

It is not known whether chemical combination takes place between the digestive ferment, which may itself be a mixture of ferments, and the lipoid used. The association may be of a physical nature but, as the activity of the resulting preparation is, in general, much higher than that of the components, there is more likelihood that a chemical combination takes place on mixing.

Thus, a preparation having a thromboplastic activity nearly equal to that of natural thromboplastin may be obtained by treating pancreatin with an ethereal extract of dehydrated cow lungs. Even more active preparations may be formed by using crystallized trypsin or a trypsin fraction obtained by fractional precipitation from pancreatin using acetone.

The amount of lipoid added to the proteinaceous material may vary within fairly wide limits; an amount of the order of 15% of the proteinaceous material has been found convenient and suitable.

The activity of the preparations made in accordance with the present invention may conveniently be assessed by noting the time taken to effect coagulation of blood plasmas consequent upon addition of the preparation.

The following table shows the activities of some preparations having thromboplastic activity on blood plasmas:

| Substance used | Time in seconds for coagulation | |
|---|---|---|
| | Cow Plasma | Human Plasma |
| Trypsin preparation | 47 | 180 |
| Lipoid fraction from lungs | 60 | 200 |
| Trypsin+5% lipoid | 12 | 50 |
| Trypsin+10% lipoid | 12 | 28 |
| Trypsin+15% lipoid | 9 | 25 |

It follows that the lipoid part as well as the protein part has a stimulating action on blood coagulation, which stimulus however is manifoldly increased by a mixture of the two components.

The following examples are illustrative of the present invention:

Example 1

A 10% solution of trypsin in water is pressed through a Seitz filter, 2 parts by volume of acetone are added to the sterile aqueous solution and the precipitate thus obtained is centrifuged and dried under sterile conditions. The dried powder is poured into a sterile lipoid solution in the proportion of 6 parts of protein to 1 part of lipoid. After evaporating of the ether in vacuo, the dry powder is ampouled under sterile conditions. It is a slightly yellowish, weakly hygroscopic preparation, sensitive to oxygen and easily soluble in water. The aqueous solution thereof is opalescent to an extent corresponding to its lipoid contents and completely or for the most part loses its activity under all conditions entailing denaturation of the protein part or removal of the lipoid part, e. g., by heating, acidifying or treating with solvents not miscible with water.

Example 2

100 parts by volume of finely pulverized pancreatin are united with a solution of 15 parts by volume of an ethereal extract from brains. The mixture is well stirred. The ether is then driven off in vacuo. The residue is dried over phosphorus pentoxide and finely pulverized. The thromboplastic preparation obtained may be stored in an atmosphere of nitrogen.

*Example 3*

Finely pulverized, crystallized trypsin is added to a benzene solution of lipoid from soja beans in a manner to make the mixture contain 5 parts by volume of trypsin to 1 part by volume of lipoid. For homogenizing, the mixture is well stirred, whereupon the benzene is evaporated in vacuo. The weakly brownish substance obtained is pulverized and stored in an atmosphere of nitrogen.

I claim:

1. A water-soluble thromboplastic active preparation comprising trypsin and a lipoid of the group consisting of lipoids obtained from lungs, brains, and soja beans, said preparation having a higher thromboplastic activity than its components.

2. A water-soluble thromboplastic active preparation comprising trypsin and about 5 to 20 per cent of a lipoid based on the trypsin, said lipoid being selected from the group consisting of lipoids obtained from lungs, brains and soja beans, said preparation having a higher thromboplastic activity than its components.

3. A water-soluble thromboplastic active preparation comprising trypsin and lipoid obtained from cow lungs, said preparation having a higher thromboplastic activity than its components.

4. A water-soluble thromboplastic active preparation comprising trypsin and lipoid obtained from brains, said preparation having a higher thromboplastic activity than its components.

5. A water-soluble thromboplastic active preparation comprising trypsin and lipoid obtained from soja beans, said preparation having a higher thromboplastic activity than its components.

6. Process for the manufacture of a water-soluble thromboplastic preparation, which comprises combining trypsin with a lipoid of the group consisting of lipoids obtained from lungs, brains and soja beans in the presence of a solvent, and drying the preparation in vacuo.

7. A process as in claim 6 wherein the amount of lipoid employed is about 5 to 20 per cent based on the trypsin.

ANDRÉ STUDER.

REFERENCES CITED

The following references are of record in the file of this patent:

American J. of Physiol., vol. 31 (1912), pp. 1–15, by Howell.

J. Biol. Chem., vol. 136 (1940), pp. 243–256, by Cohen et al.

Chem. Abstr., 1938, page 6270, by Mellanby et al.

Chem. Abstr., 1940, page 6965, by Quick.

An. Rev. Biochem., vol. 6, page 64.

An. Rev. Biochem., vol. 14, page 35.

J. Gen. Physiol., vol. 24, pp. 169–188 (1940), by Glazko, A. J. and Ferguson, J. H.

Chem. Ab., 1937, p. 4995[5], by Eagle and Harris.